United States Patent
Vos et al.

(10) Patent No.: US 8,373,085 B2
(45) Date of Patent: Feb. 12, 2013

(54) PIPE FABRICATION EQUIPMENT

(75) Inventors: Kenneth G. Vos, Lowell, MI (US); Thomas E. Winebrenner, Hastings, MI (US); Ryan H. Hansen, Walker, MI (US); William J. Evans, IV, Middleville, MI (US)

(73) Assignee: The Viking Corporation, Hastings, MI (US)

( * ) Notice: Subject to any disclaimer, the term of this patent is extended or adjusted under 35 U.S.C. 154(b) by 379 days.

(21) Appl. No.: 12/783,065

(22) Filed: May 19, 2010

(65) Prior Publication Data

US 2010/0301019 A1   Dec. 2, 2010

Related U.S. Application Data

(60) Provisional application No. 61/181,906, filed on May 28, 2009.

(51) Int. Cl.
*B23K 10/00* (2006.01)
*B23K 9/10* (2006.01)
*F16C 19/00* (2006.01)

(52) U.S. Cl. .................................. 219/121.39
(58) Field of Classification Search ............. 219/121.39, 219/44, 121.63, 121.67, 121.6, 121.78, 121.79, 219/121.5, 121.45, 121.83, 233, 246, 252
See application file for complete search history.

(56) References Cited

U.S. PATENT DOCUMENTS

| | | | |
|---|---|---|---|
| 4,740,668 A | 4/1988 | Perez | |
| 4,952,769 A | 8/1990 | Acheson | |
| 5,055,654 A | 10/1991 | Overbay | |
| 5,101,089 A | 3/1992 | Bortolotto et al. | |
| 5,198,635 A | 3/1993 | Dankovic et al. | |
| 2003/0000928 A1* | 1/2003 | Forlong | 219/121.39 |
| 2003/0230839 A1 | 12/2003 | Ursell et al. | |
| 2005/0023262 A1 | 2/2005 | Bong et al. | |
| 2006/0016792 A1* | 1/2006 | Uecker et al. | 219/137.71 |
| 2006/0163225 A1* | 7/2006 | Takahashi et al. | 219/125.11 |
| 2006/0231532 A1 | 10/2006 | Bunker et al. | |
| 2007/0251927 A1* | 11/2007 | Miessbacher et al. | 219/121.63 |
| 2008/0245774 A1* | 10/2008 | Kim et al. | 219/74 |
| 2009/0071944 A1* | 3/2009 | Forlong | 219/121.39 |

OTHER PUBLICATIONS

North Alabama Pipe Corporation; "Innovators of Piope Fabrication Equipment"; "Hole System"; http://www.nalapipe.com/hole.html (p. 1-3).

NAP Universal Welder; http://www.nalapipe.com/universa.html (p. 1-4).

Cypress Welding Equipment, Inc., a subsidiary of Weld Tooling Corporation; "Circle Welders-CW-5 series"; http://www.cypressweld.com/cw-5.htm (p. 1-4).

* cited by examiner

*Primary Examiner* — Dao H Nguyen
*Assistant Examiner* — Tram H Nguyen
(74) *Attorney, Agent, or Firm* — Harness, Dickey & Pierce, P.L.C.

(57) ABSTRACT

Plasma cutter and welder units are provided for fabricating a pipe. The plasma cutter and welder unit include a support structure having a carriage rotatably supported thereon. A plasma cutter nozzle and a weld nozzle are mounted to the carriage. A drive mechanism adjusts positioning of the plasma cutter and weld nozzles through varying control by a controller during operation. Additionally, a bearing support is provided for cradling the pipe during fabrication. The bearing support includes a plurality of bearing plates. A wedge structure is secured to each of the bearing plates and to a fixture base to form a nest for receiving the pipe. An isolation pad is disposed between the wedge structure and the fixture base.

21 Claims, 12 Drawing Sheets

PIPE FABRICATION EQUIPMENT

CROSS-REFERENCE TO RELATED APPLICATIONS

This application claims the benefit of U.S. Provisional Application No. 61/181,906, filed on May 28, 2009. The entire disclosure of the above application is incorporated herein by reference.

FIELD

The present disclosure relates to pipe fabrication equipment and more particularly, to an automated weld and plasma cutter system for use in fabricating pipe.

BACKGROUND

Figure 10:
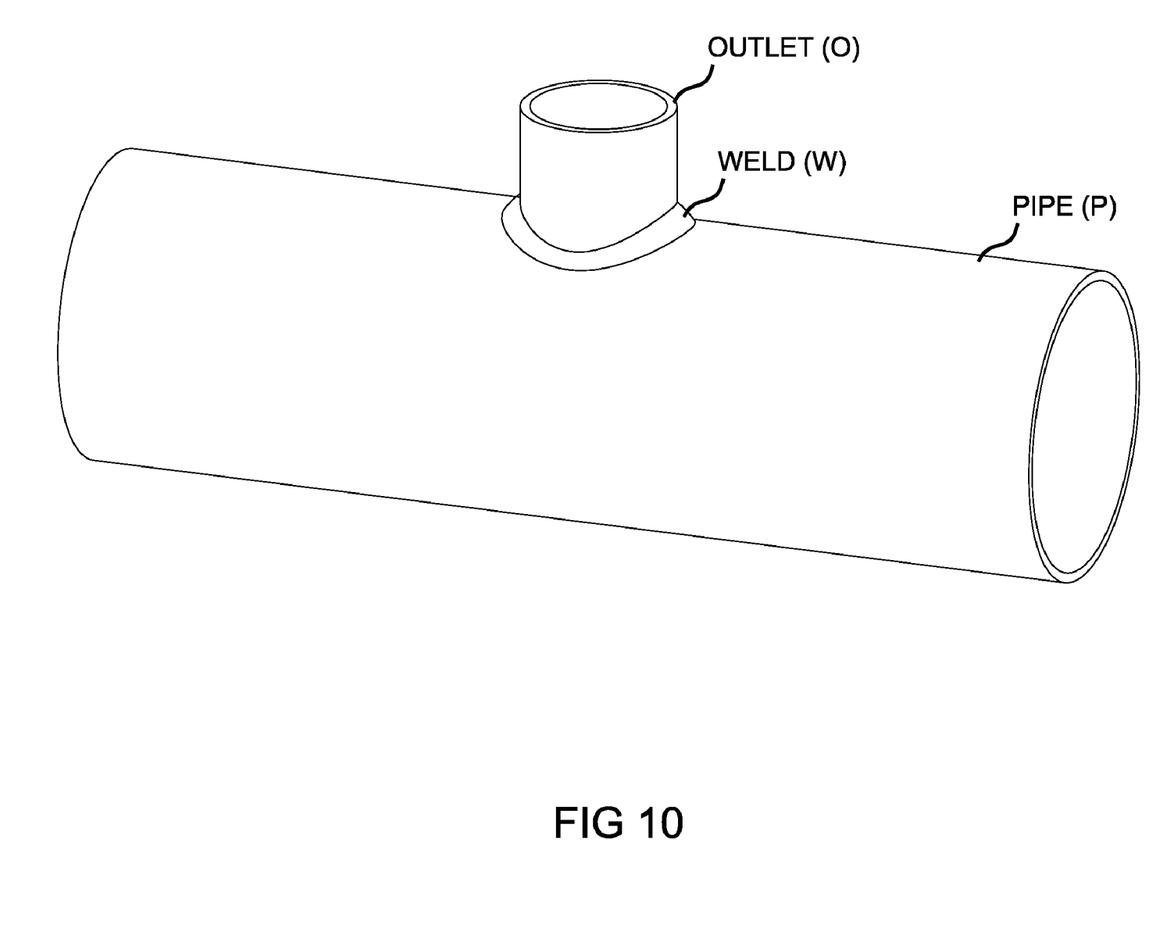
FIG. 10 is a side perspective view of a pipe segment having an outlet welded thereto.

This section provides background information related to the present disclosure which is not necessarily prior art. In the sprinkler industry as well as other industries, pipe fabrication equipment is utilized for cutting a hole in a pipe P and for securing an outlet O or other collar to the pipe P via a weld joint W, as shown in FIG. 10. This cutting of the pipe P and securing of the outlet O can be performed manually or by an automated cutter and welder system.

With automated systems, the uncut pipe P is placed in a carriage and locked in a quick chuck head. A position control system is used to set the first weld location. A size selector is then set to the requisite outlet size. When activated, the automated system engages the uncut pipe P by moving a plasma torch to the selected hole size. Upon activation, the automated system then cuts the pipe P and the plasma torch returns to the home position while removing the coupon or blank from the newly formed hole. The operator then centers the outlet O over the newly formed hole with a centering rod and a second activation of the automated system initiates a welding process for securing the outlet O to the pipe P at the newly formed hole location. When the weld W is finished, the automated system returns to the up position and is ready for the pipe P to be moved into a next position for further welding of additional outlets O thereon. If the next outlet O is differently sized, the size selector is reset and the cycle is ready to start again. Activation of the size selector causes activation of a stepper motor which, in turn, moves either the plasma torch or weld nozzle to a predetermined position relative to the selected size outlet O.

Current cutting and welding systems have been satisfactory for their intended purpose; however, the cutting process can sometimes leave jagged edges or burrs on the interior of the hole. These edges or burrs need to be ground away from the interior hole or the weld applied to the outlet can be faulty. Also, welding of outlets of equal outer diameter to the pipe is not recommended because of the possibility of welding outlets having an interrupted weld.

SUMMARY

This section provides a general summary of the disclosure, and is not a comprehensive disclosure of its full scope or all of its features.

The present disclosure provides pipe fabrication equipment including welder and plasma cutter units that can be utilized for pipe, other cylindrical vessels, or for flat plate surfaces which require polygonal holes having a collar or outlet attached thereto.

According to one aspect of the present disclosure, a welder unit is provided including a support structure having a carriage rotatably supported thereon adjacent a welding station. A weld nozzle is mounted to the carriage and a drive mechanism adjusts a position of the weld nozzle relative to the welding station. A controller varyingly controls the drive mechanism during the welding operation. By varying control of the drive mechanism during the welding operation, the welder unit can optimize the weld during the welding process. In prior welder units, stepper motors were utilized for driving the drive mechanism at a single selected speed throughout the welding operation which is not optimal for the entire weld process.

In prior circle welder systems designed for use for welding outlets on pipe, a wobble plate/cam system is typically utilized for guiding the weld nozzle in a "saddle" pattern as the welder nozzle traverses the outlet being welded to the pipe. With the welder unit according to the principles of the present disclosure, the drive mechanism includes a first servo motor and a shaft drive system for rotating the carriage during the welding operation.

According to a further aspect of the present disclosure, the drive mechanism also includes a second servo motor and a cam drive system for adjusting a height of the weld nozzle relative to the welding station. The second servo motor is controlled by the controller to adjust a position of the cam drive system during the welding operation while the carriage is rotating. This second servo motor is a slave to the first servo motor. With this functionality, the second servo motor can move in coordination with the first servo motor to trace various polygonal shapes along the pipe.

According to another aspect of the present disclosure, the drive mechanism may include a second servo motor and a radial drive system for adjusting a radial position of the weld nozzle relative to a rotational axis of the carriage during the welding operation. The second servo motor can also be controlled by the controller to move the weld nozzle away from the rotational axis during an end phase of the welding operation. With this functionality, the second servo motor can be driven to allow the weld nozzle to sweep away from the weld joint during the end phase of the welding operation in order to create a smooth weld finish.

According to another aspect of the present disclosure, the welder unit is provided with a weld wire feeding apparatus for supplying a weld wire to the weld nozzle and a controller for controlling the weld wire feeding apparatus for varying a feed rate of the weld wire during the welding operation. With this feature, the rate of weld wire feed for certain locations around the perimeter of the weld can be optimized in order to provide a superior weld as compared to prior systems which utilize a single weld wire feed rate during the welding operation. The weld wire may be appropriately fed to the weld nozzle to match the varying speed of the weld nozzle rotation.

According to a further aspect of the present disclosure, the controller for the welder unit monitors current at the weld nozzle during the welding operation. In this way, the controller can indicate to an operator when the current does not represent a predetermined current pattern that would be indicative of a successful weld. Additionally, the weld nozzle can behave as a continuity tester for establishing presence and/or location of the pipe.

According to another aspect of the present disclosure, a plasma cutter unit is provided including a support structure having a carriage rotatably supported thereon. The support structure is adjacent to a cutting station. A plasma cutter nozzle is mounted to the carriage and a drive mechanism adjusts a position of the plasma cutter nozzle relative to the cutting station. A controller varyingly controls the drive mechanism during the cutting operation. By varying control of the drive mechanism during the cutting operation, the plasma cutter unit can optimize the cut during the cutting process. In prior cutter units, stepper motors were utilized for driving the drive mechanism at a single selected speed throughout the cutting operation which is not optimal for the entire cutting process.

With the plasma cutter unit according to the principles of the present disclosure, the drive mechanism includes a first servo motor and a shaft drive system for rotating the carriage during the cutting operation.

According to a further aspect of the present disclosure, the drive mechanism also includes a second servo motor and a cam drive system for adjusting a height of the plasma cutter nozzle relative to the cutting station. The second servo motor is controlled by the controller to adjust a position of the cam drive system during the cutting operation while the carriage is rotating. This second servo motor is a slave to the first servo motor. With this functionality, the second servo motor can move in coordination with the first servo motor to trace various polygonal shapes along the pipe.

According to another aspect of the present disclosure, the drive mechanism may include a second servo motor and a radial drive system for adjusting a radial position of the plasma cutter nozzle relative to a rotational axis of the carriage during a cutting operation. The second servo motor can be controlled by the controller to move the plasma cutter nozzle from a first position disposed adjacent the rotational axis to a second position disposed at a distance to the rotational axis during a beginning phase of the cutting operation and then from the second position to a third position located at an outermost radial dimension and located along a circumference of the blank to be removed from the pipe during the cutting operation. With this functionality, burring that typically occurs at a starting point of the cutting operation will be interior of the blank. This burr reduction and/or prevention thereby eliminates the necessity for additional machining operations after the cut is completed.

According to yet another aspect of the present disclosure, a bearing support is provided for cradling the pipe during fabrication. The bearing support includes a plurality of bearing plates. A wedge structure is secured to each of the bearing plates and to a fixture base to form a nest for receiving the pipe. An isolation pad is disposed between the wedge structure and the fixture base. A plurality of roller bearings are secured to the plurality of bearing plates for contacting the pipe. Further, the isolation pads are formed from a non-conductive material, such as a phenolic material. With this arrangement, the pipe will be grounded at the isolation pads, dramatically extending the life of the roller bearings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features throughout the several views of the drawings.

With reference to FIGS. 1-12, pipe fabrication equipment 10 according to the principles of the present disclosure will now be described. Example embodiments are provided so that this disclosure will be thorough, and will fully convey the scope to those who are skilled in the art. Numerous specific details are set forth such as examples of specific components and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes and well-known structures are not described in detail.

Figure 1:
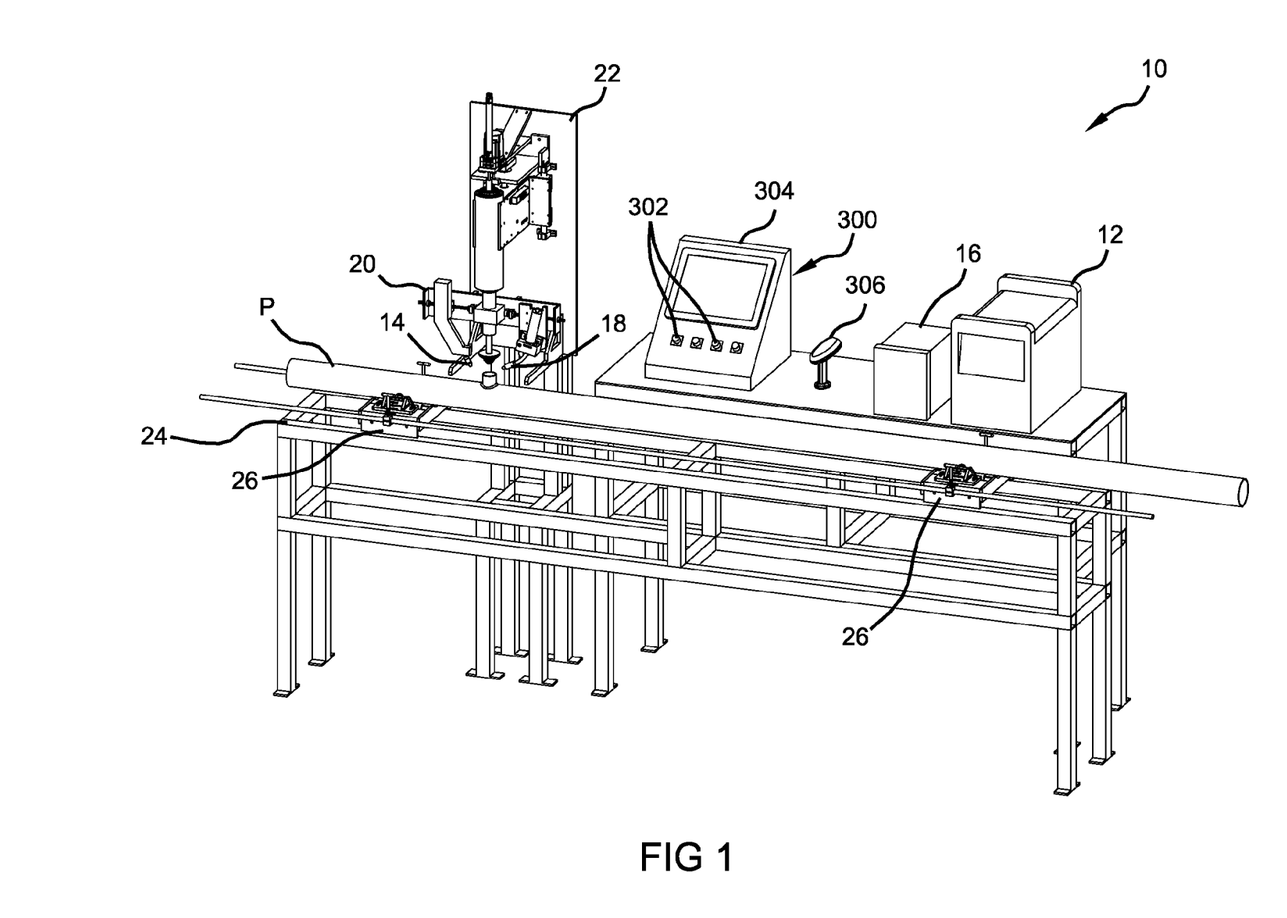
FIG. 1 is a front view of pipe fabrication equipment according to the principles of the present disclosure.

With reference to FIG. 1, the pipe fabrication equipment 10 includes a plasma cutter unit 12 for directing a plasma cutter nozzle 14 to perform a pipe cutting operation and a welder unit 16 for directing a weld nozzle 18 to perform a welding operation. The plasma cutter nozzle 14 and the weld nozzle 18 are supported by a carriage 20 that is rotatably secured to a support structure 22. The support structure 22 can be movable to various heights for performing cutting and welding operations on pipes having varying diameters. For example, a pipe P may be supported on a base 24 including a plurality of bearing supports 26 which are adapted to support the pipe P during the cutting and welding operations in a manner which is generally well known in the art.

Figure 2:
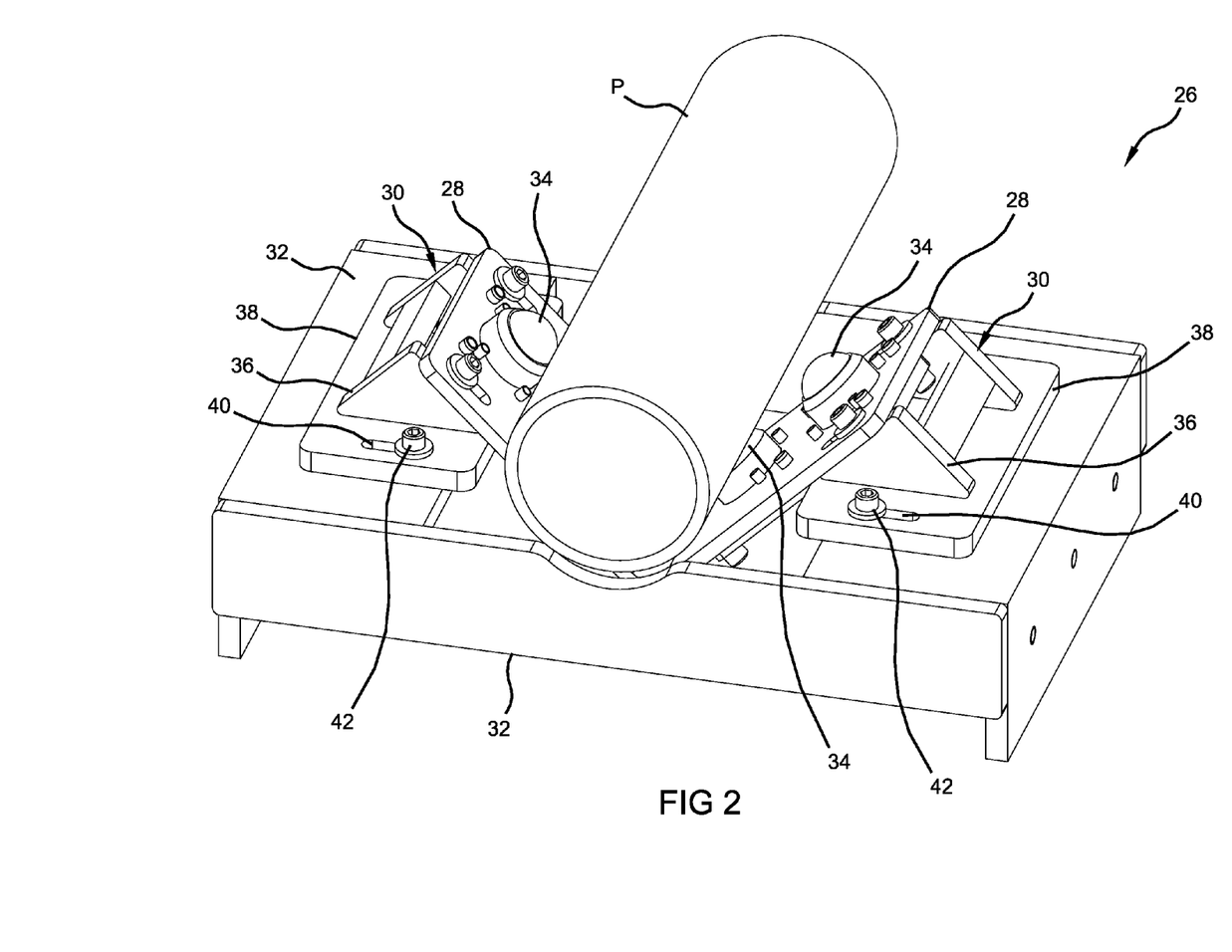
FIG. 2 is a perspective view of a bearing support according to the principles of the present disclosure.

By way of example, one of the bearing supports 26 is shown in greater detail in FIG. 2, wherein the pipe P is supported on the bearing support 26 and the bearing support 26 includes a pair of bearing plates 28, a pair of angular locating blocks 30, and a fixture base 32. The bearing plates 28 may be removably and adjustably secured to the fixture base 32 through their respective angular locating blocks 30 so as to create a V-shaped nest for receipt of the pipe P. A plurality of roller bearings 34 may be removably secured to the bearing plates 28 to provide more accurate locating and to provide an easily replaceable wear surface.

Each of the angular locating blocks 30 may include a wedge-shaped structure 36 secured to an isolation pad 38. The isolation pad 38 may be a rectangular plate formed from a non-conductive material for grounding the pipe P (e.g., phenolic material). By grounding the pipe P at the isolation pad 38, arcing through the roller bearings 34 may be minimized such that the life of the roller bearings 34 may be dramatically extended (e.g., once monthly replacement extended to once yearly replacement). The isolation pad 38 may also include a pair of slotted features 40 for receiving fasteners 42. The fasteners 42 may secure the angular locating block 30 to the fixture base 32 at a predetermined location. By reorienting the fasteners 42 along the slotted features 40, the V-shaped nest may narrow or expand so as to be capable of receiving pipes having varying sizes.

Figure 3:
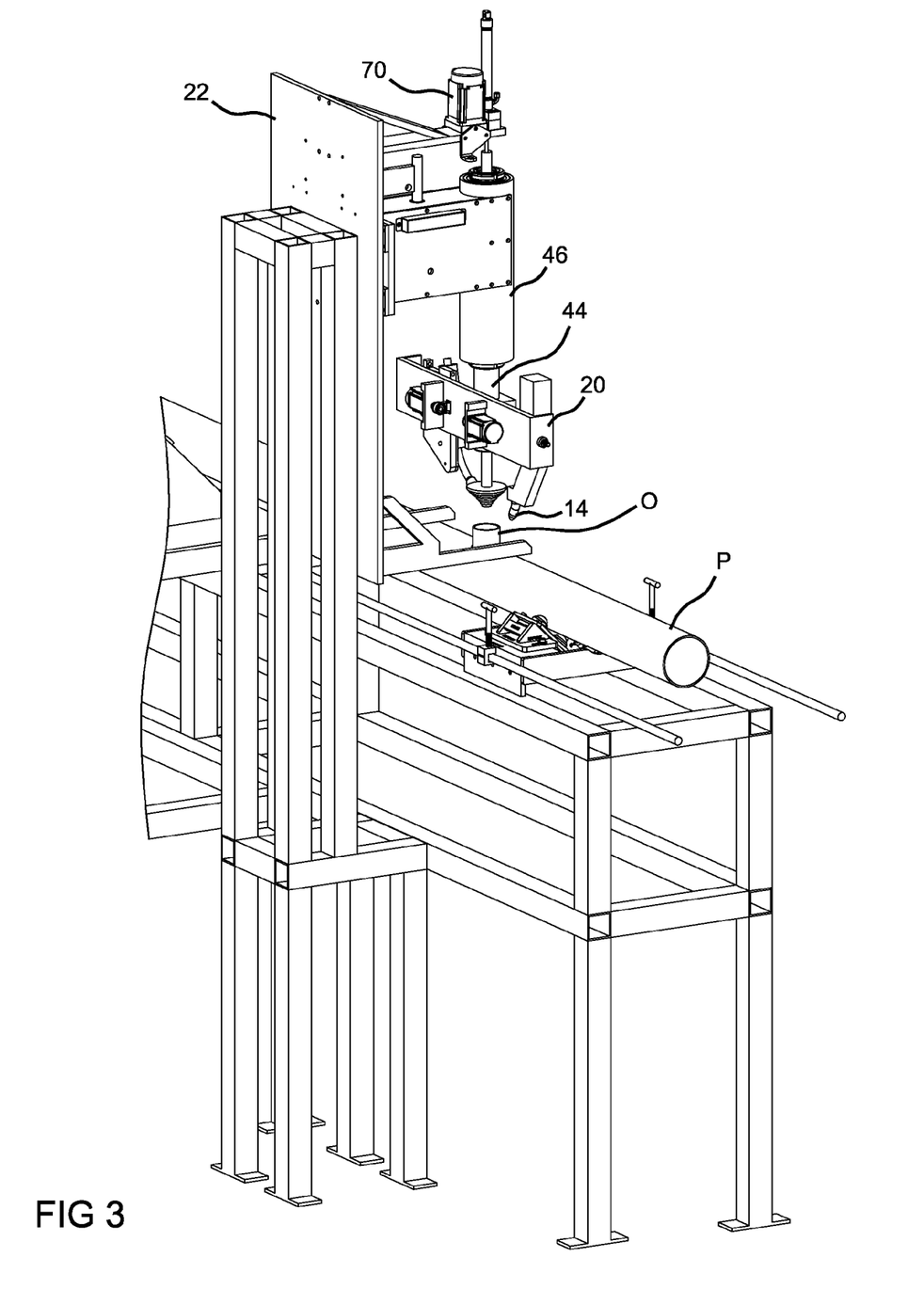
FIG. 3 is a partial rear perspective view of the pipe fabrication equipment of FIG. 1.
Figure 4:
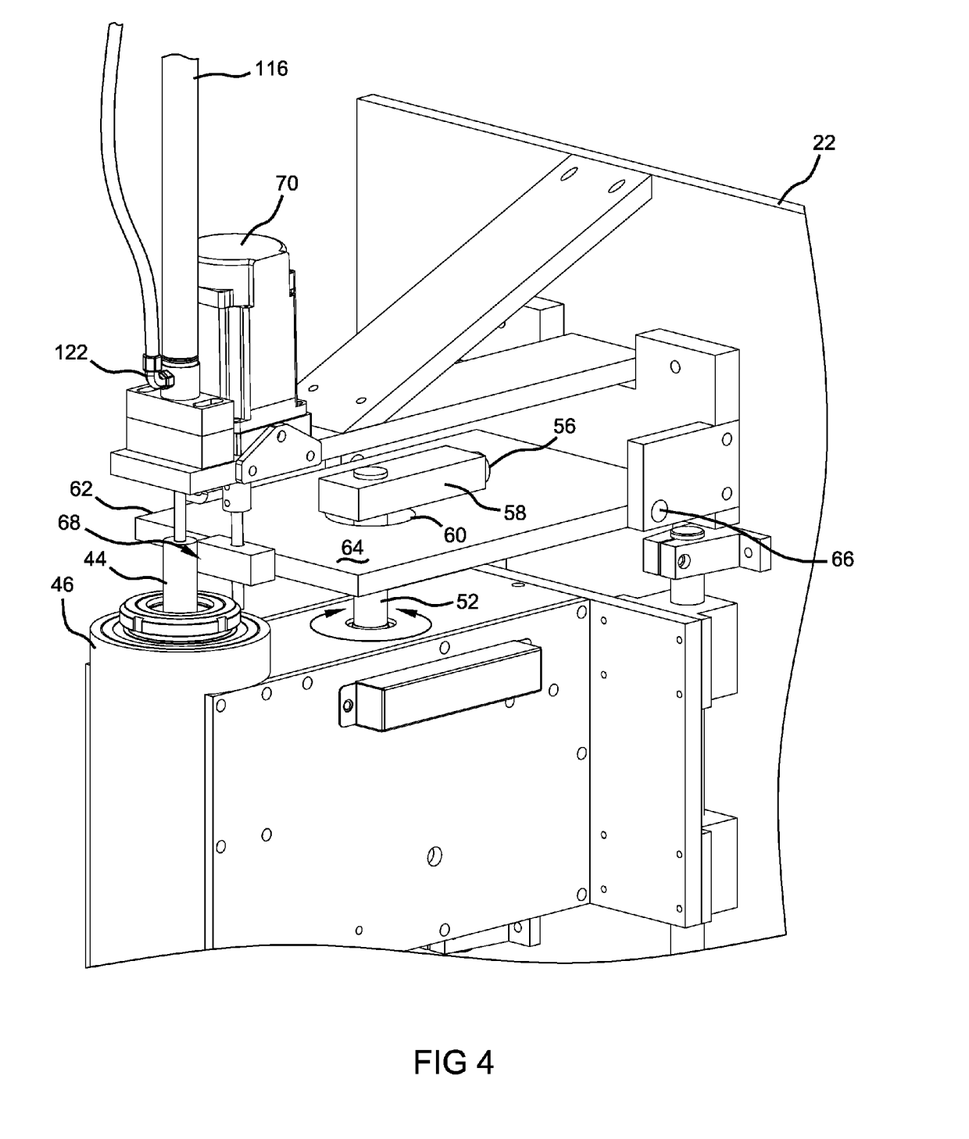
FIG. 4 is a perspective view of a wobble plate/cam adjustment drive mechanism according to the principles of the present disclosure.
Figure 5:
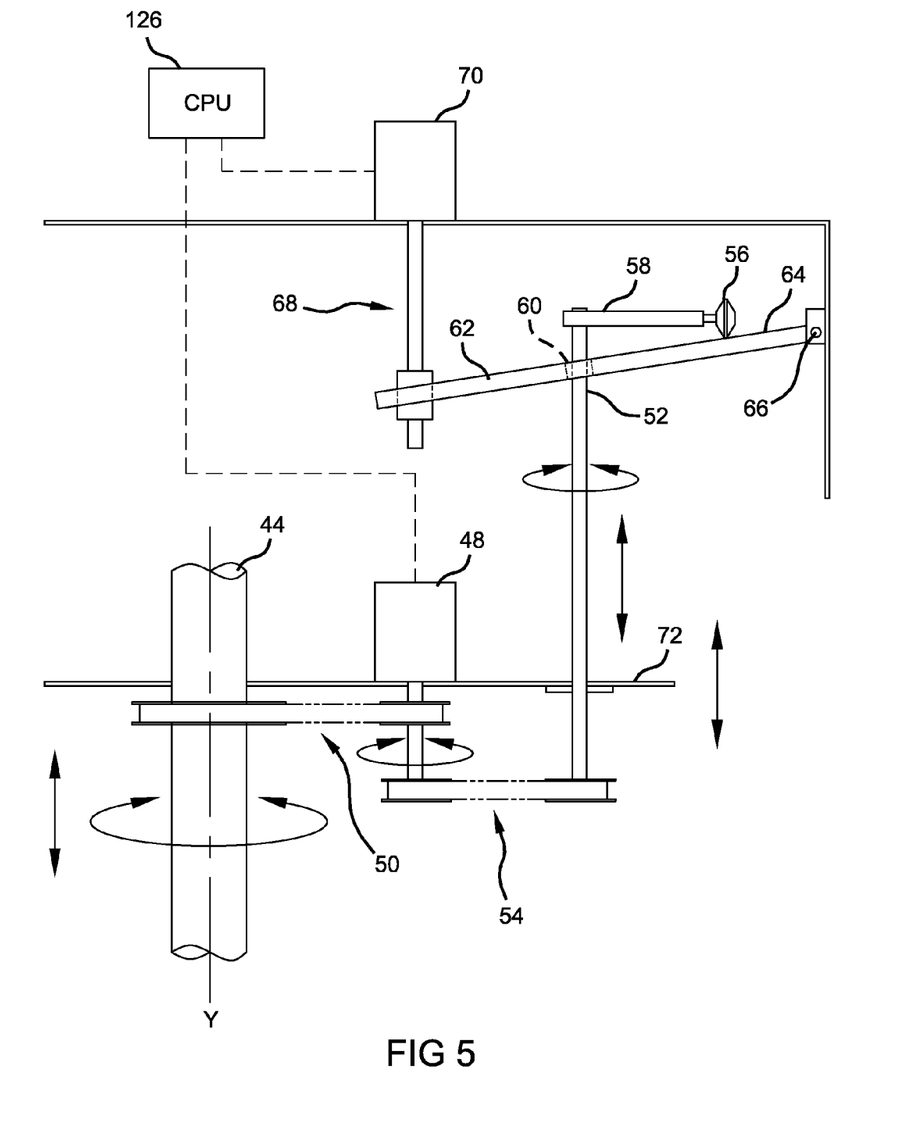
FIG. 5 is a schematic diagram of the wobble plate/cam adjustment drive mechanism of FIG. 4.

With reference to FIGS. 3 through 5, the carriage 20 is secured to a rotary shaft 44 that is supported within a housing 46 fixed to the support structure 22 for vertical movement therewith. A master servo motor 48 (FIG. 5) and a shaft drive mechanism 50 are provided for rotating the rotary shaft 44 and the carriage 20 about a center axis Y. The shaft drive mechanism 50 can be a belt and pulley arrangement, a chain and sprocket arrangement or any other gear train or drive mechanism that is capable of transmitting the rotary output of the master servo motor 48 to the rotary shaft 44.

With continued reference to FIG. 5, the master servo motor 48 is also drivingly connected to a cam shaft 52 through a cam drive mechanism 54 having a 2 to 1 drive ratio as compared to the shaft drive mechanism 50 that is connected to the rotary shaft 44. The cam shaft 52 supports a cam roller 56 at an end of an arm 58 that extends radially from the cam shaft 52. The cam shaft 52 extends through an aperture 60 of a wobble plate 62, such that the cam roller 56 is disposed against an upper surface 64 of the wobble plate 62. The wobble plate 62 is pivotally mounted at a first end to a pivot 66 and at a second end to a ball and screw drive mechanism 68 which is driven by a slave servo motor 70. Operation of the slave servo motor 70 can adjust the angular position of the wobble plate 62 during the operation of the master servo motor 48.

The cam shaft 52 is connected to a lift plate 72 such that as the cam roller 56 traverses a circular path along the surface of the angled wobble plate 62, the lift plate 72 raises and lowers. The master servo motor 48 and the rotary shaft 44 can be supported for movement with the lift plate 72, such that as the lift plate 72 moves vertically in response to the rotation of the cam shaft 52 relative to the wobble plate 62, the rotary shaft 44 also move vertically. Therefore, as the master servo motor 48 drives the cam shaft 52 at a 2 to 1 ratio to the rotary shaft 44, the lift plate 72 is lifted and lowered twice during a 360 degree rotation of the rotary shaft 44. The raising and lowering of the lift plate 72 during rotation of the rotary shaft 44 causes the plasma cutter nozzle 14 and the weld nozzle 18 to follow a "saddle" shaped path as they traverse along the surface of the pipe P. The increased rotation of the cam shaft 52 as compared to the rotary shaft 44 causes the two raising and lowering motions needed to follow the "saddle" shaped path.

In prior welding and cutting systems, the position of the wobble plate 62 was controlled by a stepper motor so that the wobble plate 62 was moved to and held in one position during the entire cutting and/or welding operation. The operation of the prior art cutting and welding systems is sufficient for many applications, but resulted in limited ability for welding larger outlets to the pipe (i.e., where the size of the outlet approaches the size of the pipe) or to weld outlets having an irregular shape (e.g., polygonal shapes other than round). With a master-slave servo arrangement according to the principles of the present disclosure, the position of the wobble plate 62 can be adjusted during the cutting and/or welding operations in order to optimize the position of the plasma cutter or weld nozzle 14, 18 during the cutting and welding operations. The ability to control the position of the wobble plate 62 during the cutting and/or welding operations allows for more flexibility in outlet shape/size as well as improved cut and weld quality.

Figure 6:
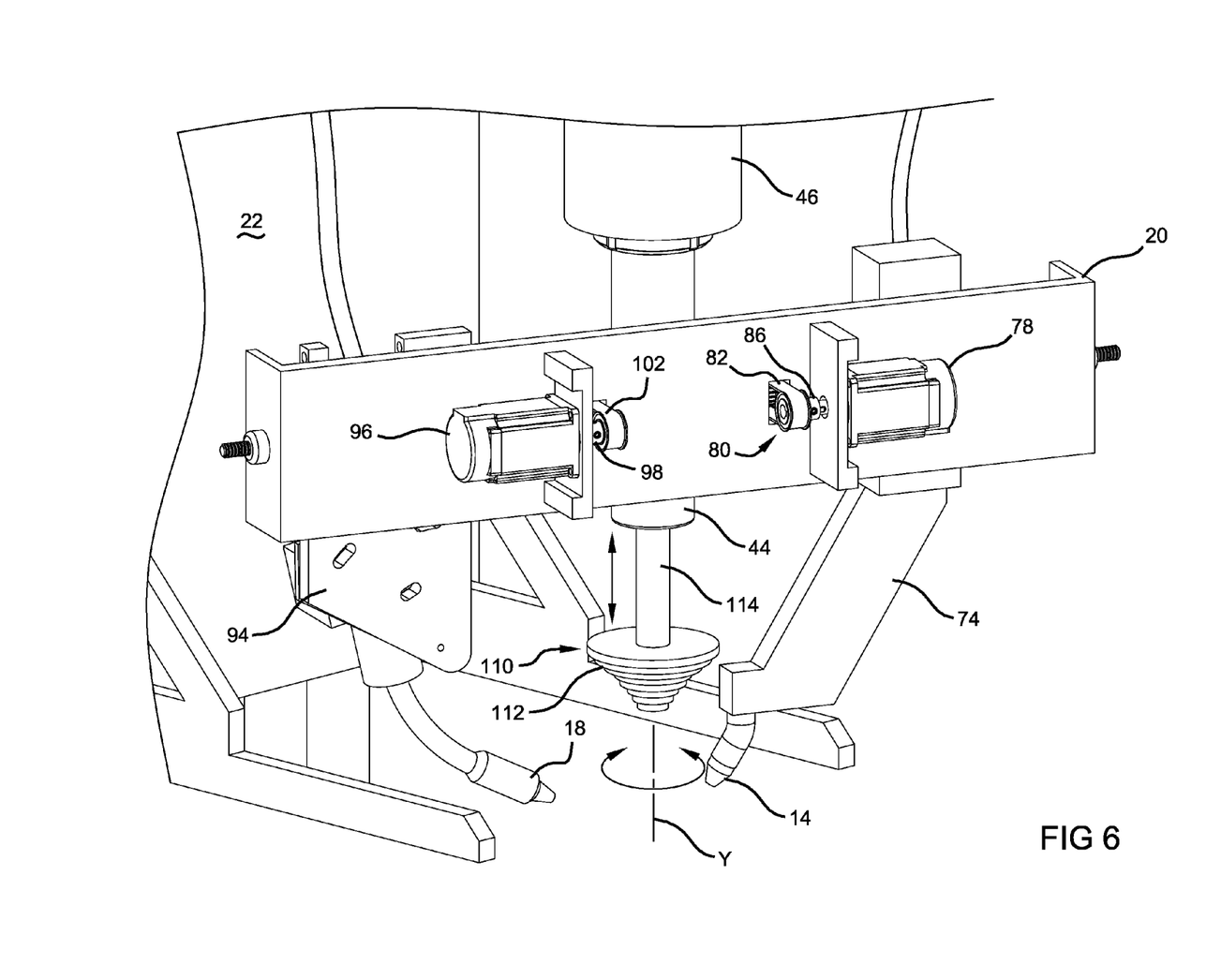
FIG. 6 is a perspective view of a plasma cutter and weld nozzle arrangement according to the principles of the present disclosure.
Figure 7:
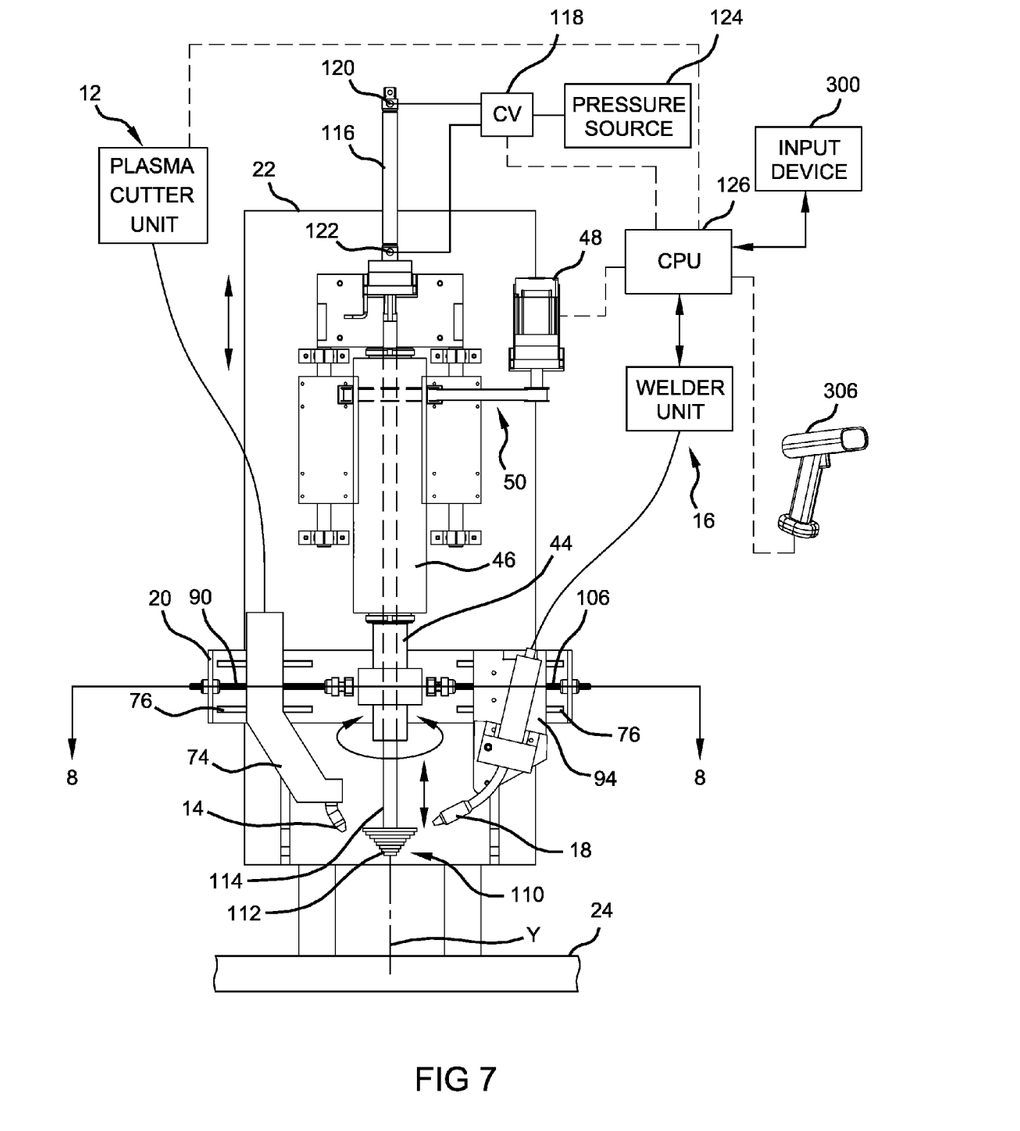
FIG. 7 is a schematic diagram of the pipe fabrication equipment according to the principles of the present disclosure.
Figure 8:
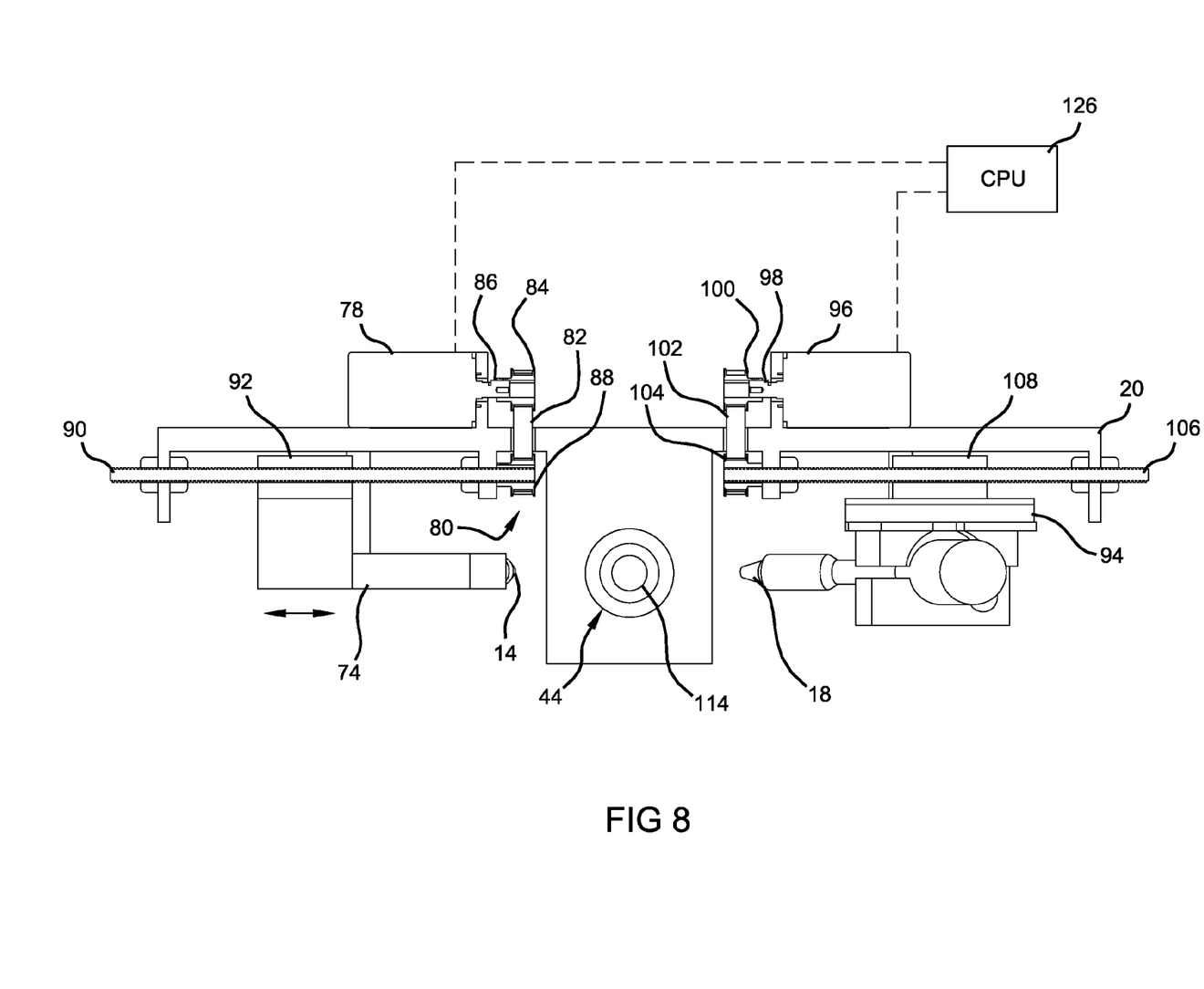
FIG. 8 is a sectional view taken along line 8-8 of FIG. 7.

Referring now to FIGS. 6 through 8, the plasma cutter nozzle 14 can be supported on the carriage 20 by a slide arm 74 that is slidably supported by a guide rail 76 and is radially positionable relative to the center axis Y by a servo motor 78 and a drive mechanism 80. The drive mechanism 80 can include a belt 82 which is drivingly attached to a pulley 84 secured to an output shaft 86 of the servo motor 78. The belt 82 is further attached to a second pulley 88 connected to a screw drive shaft 90. The screw drive shaft 90 engages a ball-type follower member 92 that is connected to the slide arm 74 so as to cause radial movement of the slide arm 74 relative to the center axis Y to thereby position the plasma cutter nozzle 14 in a desired position. In this arrangement, activation of the servo motor 78 causes rotational movement of the output shaft 86 which is translated to the screw drive shaft 90 through the pulleys 84, 88 and belt 82 arrangement. The rotational movement of the screw drive shaft 90, in turn, causes lateral movement of the follower member 92 along with the slide arm 74.

Similarly, the weld nozzle 18 can be supported by a slide arm 94 slidably mounted to the carriage 20. A servo motor 96 is mounted to the carriage 20 and includes an output shaft 98 having a pulley 100 thereon. A belt 102 is drivingly connected to the pulley 100 and engages a second pulley 104 mounted to a screw drive shaft 106. A ball-type follower member 108 is engaged with the screw drive shaft 106 and connected to the slide arm 94 to cause controlled radial movement of the weld nozzle 18 relative to the center axis Y. In this arrangement, activation of the servo motor 96 causes rotational movement of the output shaft 98, which is translated to the screw drive shaft 106 through the pulleys 100, 104 and belt 102 arrangement. The rotational movement of the screw drive shaft 106, in turn, causes lateral movement of the follower member 108 along the slide arm 94.

Upon activation of the master servo motor 48, the rotary shaft 44 is caused to rotate which causes rotation of the carriage 20 about the center axis Y. The rotary movement of the carriage 20 allows either the plasma cutter nozzle 14 or weld nozzle 18 to perform a polygonal cutting and welding operation (e.g., circular, elliptical), as will be described in more detail below. The plasma cutter unit 12 is generally well known in the art and is known to be used for cutting holes in pipe. Furthermore, the welder unit 16 is also generally well known in the art and is commonly used for welding outlets O or other collars on to the pipe P. Accordingly, these units 12, 16 will not be described in detail herein.

During the welding operation, an outlet guide and centering device 110 is utilized for holding the outlet O in place on the pipe P. The outlet guide and centering device 110 can include a cone-shaped guide member 112 supported by a rod 114 which extends through a center of the rotary shaft 44 and engages a piston (not shown) disposed within a pneumatic cylinder 116 positioned above the housing 46. The pneumatic cylinder 116 can be provided with pneumatic air pressure to cause the rod 114 to either extend to a lower guide position or to a retracted non-use position. A control valve 118 can be utilized in connection with upper and lower ports 120, 122 that communicate with the pneumatic cylinder 116. The control valve 118 can also communicate with a pneumatic air pressure source 124. The control valve 118 can be controlled to cause the guide rod 114 to move between the lower guide position and the retracted non-use position according to controls received from a controller or central processor unit (CPU) 126.

The CPU 126 can also provide control signals to the master servo motor 48 to control the rotation of the rotary shaft 44. In particular, the CPU 126 can provide a signal to the master servo motor 48 to vary the rate of rotation of the rotary shaft 44 during the welding process. The capability to vary the rate of rotation of the rotary shaft 44 during the cutting and welding operations provides unique advantages that are not available with presently available cutting and welding devices. In particular, by varying the rate of rotation of the rotary shaft 44 during the cutting operation a cleaner cut can be achieved, thereby eliminating the necessity for a post cutting de-burring operation. Furthermore, by varying the rate of rotation of the rotary shaft 44 during the welding operation, the welding operation can be performed at an optimum speed for all points around the circumference of the weld.

The CPU 126 can also alter the radial position of the plasma cutter nozzle 14 for additional cutting and welding benefits. For example during the cutting operation, the CPU 126 can control operation of the servo motor 78, which in turn, controls position of the slide arm 74 along the carriage 20. In this way, the plasma cutter nozzle 14 can initiate a cutting operation for a round hole any point within or around a coupon or blank 128 (FIGS. 9A and 9B) that is being cut from the pipe P. With prior plasma cutter designs, the initial cut location could only be located on the cut edge of the blank 128. It has been found, however, that the initial cut location for cutting a hole in a pipe typically exhibits a heavy burr formation. By initiating the cutting process radially inwardly from the circumference of the blank 128 being cut, the heavy burring that can occur at the cut start location is located within the blank 128 being removed from the pipe P.

Figure 9A:
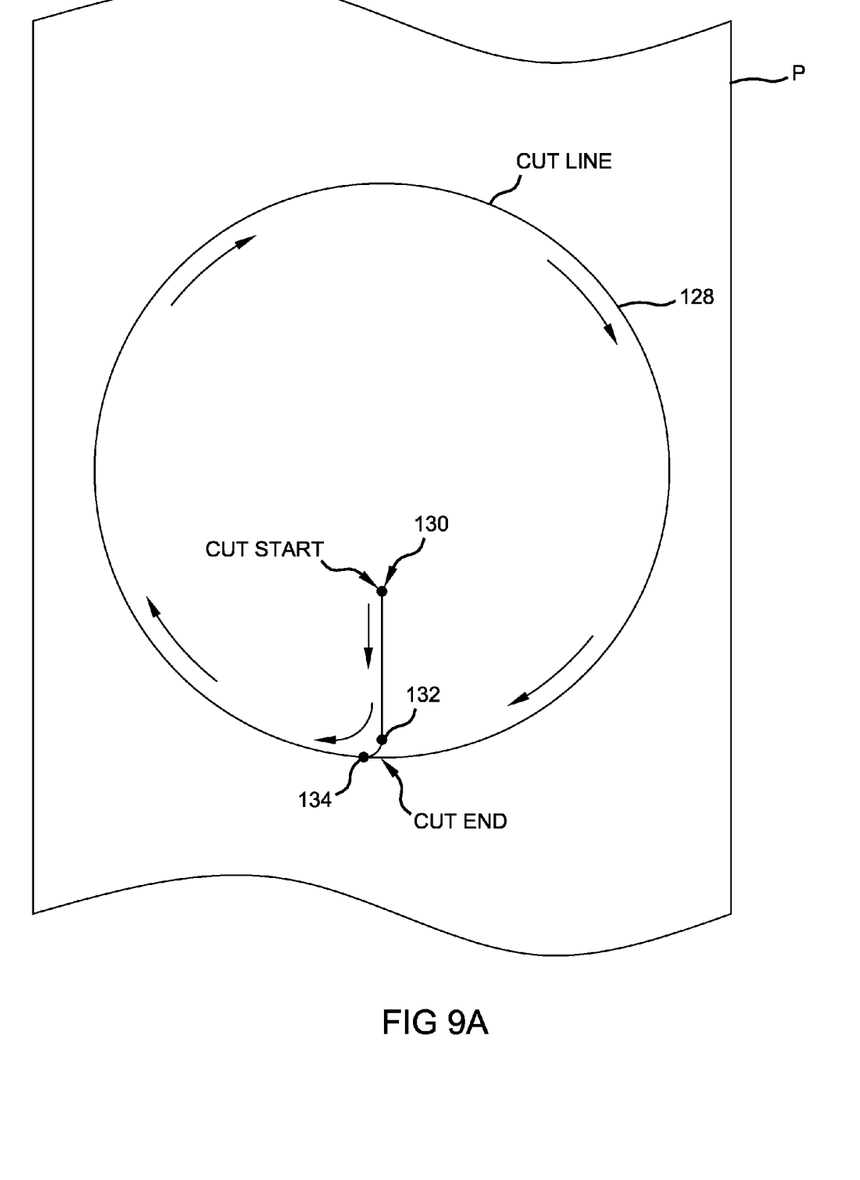
FIG. 9A is a schematic illustration of a cutting pattern for cutting a pipe according to the principles of the present disclosure.

Two alternate cutting patterns will now be described with reference to FIGS. 9A and 9B. In a circular cutting pattern, as illustrated in FIG. 9A, the plasma cutter nozzle 14 can start at a location 130 on the interior of the blank 128. The servo motor 78 can move the plasma cutter nozzle 14 radially outward towards a location 132 near the circumference of the cut being performed. Then, the carriage 20 can be rotated in a controlled manner by the master servo motor 48 to provide a clockwise circular cut (to location 134), thereby preventing the formation of a burr along the circumference of the blank 128 and omitting post-cut machining for burr removal. The plasma cutter nozzle 14 may then follow a continuous circular cutting pattern along a cut line to remove the blank 128. It is noted that with a stepper motor as utilized in previous designs, this type of movement during a cutting process was not available.

Figure 9B:
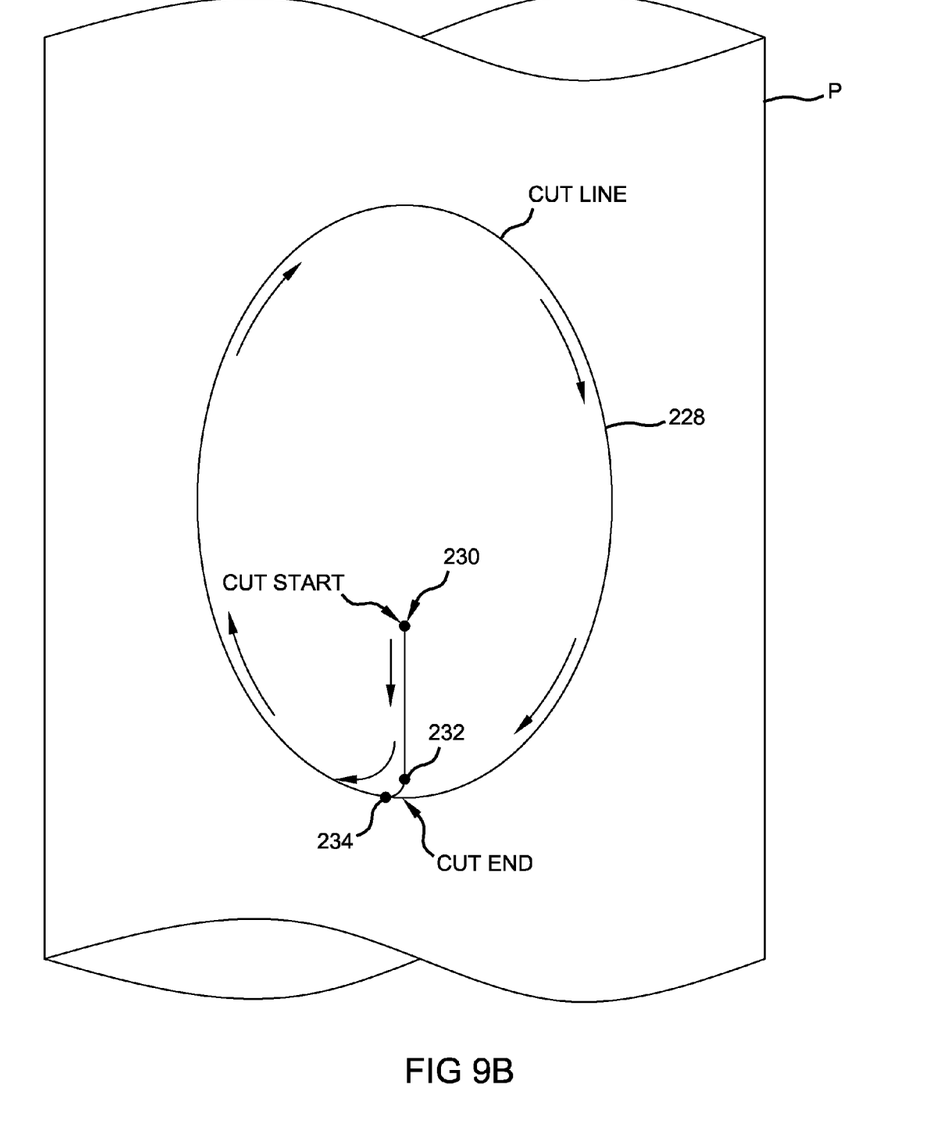
FIG. 9B is a schematic illustration of another cutting pattern for cutting a pipe according to the principles of the present disclosure.

The plasma cutter nozzle 14 and servo motor 48, 78 arrangement can also be utilized to create various other cut shapes, such as illustrated in FIG. 9B. The plasma cutter nozzle 14 again initiates the cut operation at an inward location 230 of a blank 228. The servo motor 78 can move the plasma cutter nozzle 14 radially outward towards a location 232 near the circumference of the cut being performed. Then, the carriage 20 can be rotated in a controlled manner by the master servo motor 48 to provide a clockwise circular cut (to location 234), thereby preventing the formation of a burr along the circumference of the blank 228 and omitting post-cut machining for burr removal. The plasma cutter nozzle 14 may then follow a continuous circular cutting pattern along a cut line to remove the blank 228. In this example, the plasma cutter nozzle 14 follows an elliptical path, however, it should be understood that the plasma cutter nozzle 14 can be manipulated to follow any path to accommodate outlets O having alternate shapes.

Similarly to the plasma cutter nozzle 14, the CPU 126 can also manipulate the weld nozzle 18 in a controlled fashion during the welding operation. For example, the CPU 126 controls operation of the servo motor 96 for moving the welder support slide arm 94 along the carriage 20. In this way, the CPU 126 can adjust position of the weld nozzle 18 during the welding operation. In particular, as the weld operation is nearing completion, it is desirable to control the position of the weld nozzle 18 so as to sweep away from the weld being performed. By being able to sweep the weld nozzle 18 radially outward away from the weld W as the weld is being completed, a smoother weld finish can be obtained. Thus, the CPU 126 can be programmed to cause activation of the servo motor 96 to sweep the weld nozzle 18 radially away from the weld joint W as completion of the rotary motion of the carriage 20 is completed.

Referring again to FIG. 7, the CPU 126 can also bi-directionally communicate with and control operation of the plasma cutter and welder units 12, 16 during the cutting and welding operations. In particular, the CPU 126 can control the voltage applied to the plasma cutter unit 12 or welder unit 16 so as to optimize the cutting and welding process throughout the complete rotation of the carriage 20. Furthermore, the feed of a weld wire (not shown) to the weld nozzle 18 can also be controlled so as to be varied during the welding operation. In previous automated welding systems, the wire feed rate was set to a single feed rate for the complete weld operation. However, with the CPU 126 of the present disclosure, the wire feed rate can be altered during the welding operation so as to provide the optimal amount of wire feed depending upon the location of the weld nozzle 18 along the weld joint W.

Additionally, the availability of bi-directional communication means that the CPU 126 can also receive and process information obtained by the plasma cutter unit 12 and/or welder unit 16. For example, the CPU 126 can monitor amperage out from the weld nozzle 18 to adaptively control rotational speed and wire feed rates. The CPU 126 can also send a low current through the weld nozzle 18 to physically locate the pipe P, thereby turning the welder unit 16 into a continuity tester device for finite adjustments of the plasma cutter and weld nozzles 14, 18.

Figure 11:
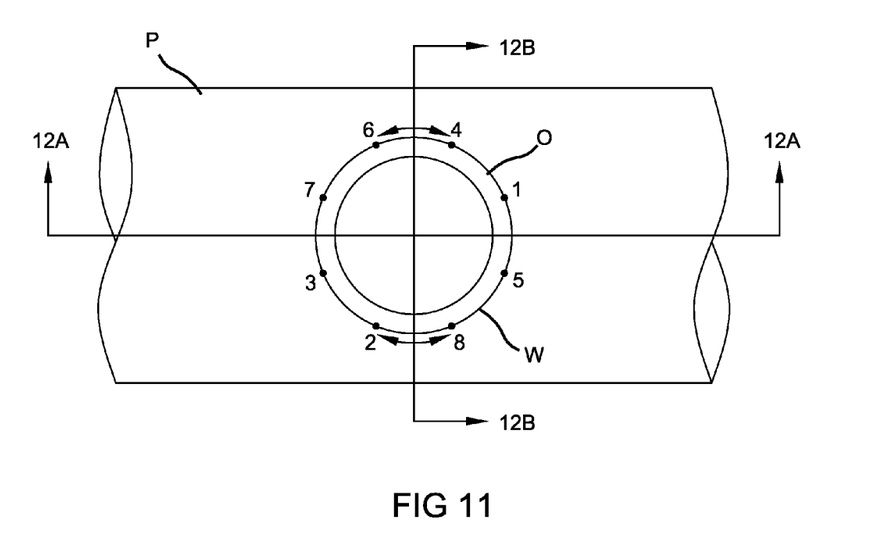
FIG. 11 is a schematic illustration of a weld pattern according to the principles of the present disclosure.
Figure 12A:
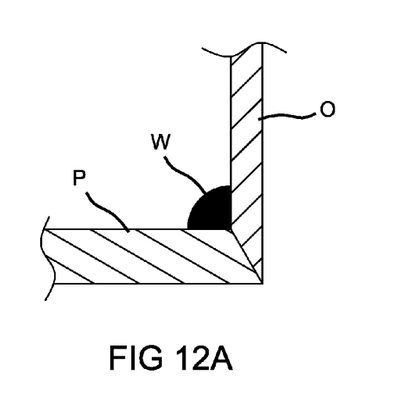
FIG. 12A is a sectional view of a weld taken along line 12A-12A of FIG. 11.
Figure 12B:
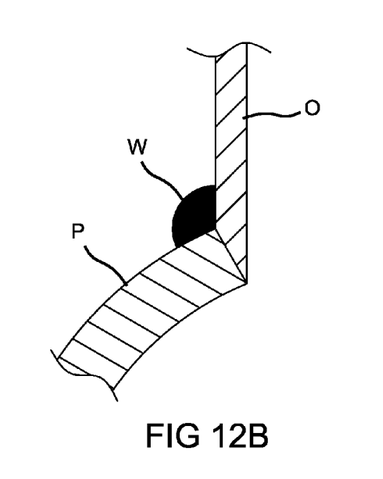
FIG. 12B is a sectional view of the weld taken along line 12B-12B of FIG. 11.

With reference now to FIGS. 11, 12A and 12B, the system of the present disclosure also provides the capability of welding outlets O with an interrupted weld configuration. It has been discovered that welding "uphill" does not always produce good weld results due to the flow of the weld material. The system of the present disclosure can be utilized for providing an interrupted weld pattern where the weld nozzle 18 can make overlapping strokes always substantially in the downward direction in order to improve the weld quality.

In one example, the weld W can be completed in segments moving clockwise from point 1 to point 2 and from point 3 to point 4. The weld W can then be reversed, so as to move counter-clockwise from point 5 to point 6 and from point 7 to point 8. As can be seen, overlapping of the weld segments occurs between points 1 and 5, points 2 and 8, points 3 and 7, and points 4 and 6. The amount of overlap can be adjusted as needed. With this type of an interrupted weld pattern, each segment of the weld W is performed substantially on a downward slope of the pipe in order to provide an improved weld quality. This adjustment of the weld W can accommodate the differing interaction profile shapes between the pipe P and the outlet O as can be seen from FIGS. 12A and 12B.

It should also be understood that during the overlapping portions of the weld W, the weld nozzle 18 can be swept away from the weld W by activation of the servo motor 96 to provide a smoother weld. By forward and reverse operation of the servo motor 48, each segment of the weld W can be performed in a substantially downhill manner relative to the top surface of the pipe P and at an appropriate speed and wire feed rate. As the speed of the servo motor 48 can be varied during the welding process, the welder unit 16 of the present disclosure can be manipulated to provide various stitch welding operations (e.g., back-forth, in-out, zigzag). The speed of the servo motor 48 can also be controlled to an optimum speed during the welding process for eliminating holes and bubbles in the weld.

Referring again to FIGS. 1 and 7, an input device 300 can be utilized for inputting information to the CPU 126. The input device 300 can include buttons 302 for externally controlling the welding operation and for inputting additional manual data that can be utilized by the CPU 126. The input device 300 can also include a display 304 that can provide visual cues to the operator regarding the operations being performed. For example, the display 304 can indicate to the operator the particular weld W that is being performed on the given pipe P.

Furthermore, a barcode reader device 306 can be utilized for reading barcode or other data storage means associated with the pipe P. The barcode reader device 306 can communicate directly to the CPU 126 the specific weld W required for the given pipe P. In particular, the pipe P can include multiple outlets O that are scheduled to be welded to the pipe P. The size and axial location of the outlets O along the pipe P can vary. The barcode information or other data stored with regard to each pipe P can include the axial location of the outlet O along the pipe P, diameter of the outlet O, and location of the outlet O relative to the upper, lower, left-side, or right-side surfaces of the pipe P. By reading the barcode information for the particular pipe P, the CPU 126 can automatically set the plasma cutter and/or welder units 12, 16 for performing each of the required cutting and welding tasks on the pipe P without manual entry by the operator. Therefore, the operator can save a great deal of time previously spent entering location and outlet diameter data into the system. Automated input of these minute details can also minimize the effects of human error. It is noted that the barcode reader device 306 can be wireless or otherwise directly connected to the CPU 126.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A welder unit, comprising:
a support structure;
a carriage rotatably supported on said support structure adjacent a welding station;
a weld nozzle mounted to said carriage;
a drive mechanism for adjusting a position of said weld nozzle relative to said welding station; and
a controller varyingly controlling said drive mechanism during a welding operation.

2. The welder unit according to claim 1, wherein said drive mechanism includes a first servo motor and a shaft drive system for rotating said carriage during said welding operation.

3. The welder unit according to claim 2, wherein said drive mechanism includes a second servo motor and a cam drive system for adjusting a height of said weld nozzle relative to said welding station, said second servo motor being controlled by said controller to adjust a position of said cam drive system during said welding operation while said carriage is rotating.

4. The welder unit according to claim 3, wherein said second servo motor is a slave to said first servo motor.

5. The welder unit according to claim 2, wherein said drive mechanism includes a second servo motor and a radial drive system for adjusting a radial position of said weld nozzle relative to a rotational axis of said carriage during said welding operation.

6. The welder unit according to claim 5, wherein said second servo motor is controlled by said controller to move said weld nozzle away from said rotational axis during an end phase of said welding operation.

7. The welder unit according to claim 1, further comprising a weld wire feeding apparatus for supplying a weld wire to said weld nozzle, said controller controlling said weld wire feeding apparatus for varying a feed rate of said weld wire during said welding operation.

8. The welder unit according to claim 1, wherein said controller monitors a current at said weld nozzle during said welding operation.

9. A welder unit, comprising:
a support structure;
a carriage rotatably supported on said support structure adjacent a welding station;
a weld nozzle mounted to said carriage;
a drive mechanism for adjusting a position of said weld nozzle relative to said welding station;
a controller varyingly controlling said drive mechanism during a welding operation; and
wherein said controller controls said drive mechanism and said weld nozzle to perform a weld around an outlet on a round pipe in a series of substantially downwardly directed overlapping welding strokes.

10. A plasma cutter unit, comprising:
a support structure;
a carriage rotatably supported on said support structure adjacent a cutting station;
a plasma cutter nozzle mounted to said carriage;
a drive mechanism for adjusting a position of said plasma cutter nozzle relative to said cutting station; and
a controller varyingly controlling said drive mechanism during a cutting operation.

11. The plasma cutter unit according to claim 10, wherein said drive mechanism includes a first servo motor and a shaft drive system for rotating said carriage during said cutting operation.

12. The plasma cutter unit according to claim 11, wherein said drive mechanism includes a second servo motor and a cam drive system for adjusting a height of said plasma cutter nozzle relative to said cutting station, said second servo motor being controlled by said controller to adjust a position of said cam drive system during said cutting operation while said carriage is rotating.

13. The plasma cutter unit according to claim 12, wherein said second servo motor is a slave to said first servo motor.

14. The plasma cutter unit according to claim 11, wherein said drive mechanism includes a second servo motor and a radial drive system for adjusting a radial position of said plasma cutter nozzle relative to a rotational axis of said carriage during said cutting operation.

15. The plasma cutter unit according to claim 14, wherein said second servo motor is controlled by said controller to move said plasma cutter nozzle from a first position disposed adjacent said rotational axis to a second position disposed at a distance to said rotational axis during a beginning phase of said cutting operation.

16. The plasma cutter unit according to claim 15, wherein said second servo motor moves said plasma cutter nozzle from said second position to a third position located at an outermost radial dimension for said cutting operation.

17. The plasma cutter unit according to claim 16, wherein said third position is along a circumference of a blank to be removed from a pipe during said cutting operation.

18. A bearing support for cradling a pipe during a pipe fabrication operation, comprising:
 a plurality of bearing plates;
 a wedge structure secured to each of said bearing plates;
 a fixture base for adjustably securing said wedge structure to form a nest for receiving the pipe; and
 an isolation pad disposed between said wedge structure and said fixture base.

19. The bearing support according to claim 18, further comprising a plurality of roller bearings secured to said plurality of bearing plates, said plurality of roller bearings contacting said pipe.

20. The bearing support according to claim 18, wherein said isolation pad is formed from a non-conductive material.

21. A bearing support for cradling a pipe during a pipe fabrication operation, comprising:
 a plurality of bearing plates;
 a wedge structure secured to each of said bearing plates;
 a fixture base for adjustably securing said wedge structure to form a nest for receiving the pipe;
 an isolation pad disposed between said wedge structure and said fixture base;
 wherein said isolation pad is formed from a non-conductive material; and
 wherein said non-conductive material is a phenolic material.

* * * * *